United States Patent
Horn et al.

(10) Patent No.: US 8,208,561 B2
(45) Date of Patent: Jun. 26, 2012

(54) TECHNIQUE FOR MEDIA FRAME DECODING

(75) Inventors: Uwe Horn, Aachen (DE); Markus Kampmann, Aachen (DE); Torbjörn Einarsson, Stockholm (SE); Klaus Stuhlmueller, Zirndorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 464 days.

(21) Appl. No.: 12/375,300

(22) PCT Filed: Jul. 27, 2006

(86) PCT No.: PCT/EP2006/007465
§ 371 (c)(1),
(2), (4) Date: Sep. 4, 2009

(87) PCT Pub. No.: WO2008/011899
PCT Pub. Date: Jan. 31, 2008

(65) Prior Publication Data
US 2010/0046632 A1    Feb. 25, 2010

(51) Int. Cl.
*H04N 11/04* (2006.01)

(52) U.S. Cl. .............................. 375/240.25; 375/240.01
(58) Field of Classification Search .................... None
See application file for complete search history.

(56) References Cited

U.S. PATENT DOCUMENTS

2004/0160974 A1* 8/2004 Read et al. ............... 370/431
2007/0192812 A1* 8/2007 Pickens et al. ............ 725/94

FOREIGN PATENT DOCUMENTS

EP    1 523 190 A    4/2005
* cited by examiner

*Primary Examiner* — Donald Mills (57) ABSTRACT

A technique that permits an earlier start of the decoding and play out of media frames received via a point-to-multipoint transmission is described. The media frames comprise frames of a first type that cannot be decoded without knowledge of supplemental information and frames of a second type that include the supplemental information. According to a method aspect of this technique, frames of the first type are received and immediately buffered without waiting for reception of a frame of the second type. In a next step, a request message requesting supplemental information required for a decoding of the buffered frames of the first type is sent. Upon receipt of the requested supplemental information, the buffered frames are decoded based on the received supplemental information.

14 Claims, 4 Drawing Sheets

TECHNIQUE FOR MEDIA FRAME DECODING

FIELD OF THE INVENTION

The present invention generally relates to the field of decoding media frames that are received via a point-to-multipoint transmission. In particular, the invention relates to the decoding of media frames that cannot be decoded without knowledge of supplemental information.

BACKGROUND OF THE INVENTION

Digital television and interactive media applications such as on-demand video services are becoming increasingly popular throughout the world. Due to the enormous amounts of digital data involved, efficient data compression schemes have been developed and standardised. The Moving Picture Experts Groups (MPEG) for example has defined several media compression standards including MPEG-1 and MPEG-2.

Media compression, also referred to as coding herein, aims at removing redundant information included in a sequence of pictures that form a particular media stream. Generally, an encoder at a transmitter site removes the redundancy prior to transmission, and a decoder at a receiver site re-inserts the redundancy prior to play out. The encoder exploits the fact that the individual pixel values of a sequence of digital pictures are not independent, but are correlated with their neighbours both within the same picture (spatial redundancy) and across a picture sequence (temporal redundancy). Temporal redundancy permits a prediction of the next picture from a previous "reference" picture.

The MPEG standards define various different coding modes for translating individual pictures into coded frames exploiting temporal redundancy for data compression purposes. The different coding modes give rise to different frame types.

"Intra" frames (I-frames) have been coded independently, i.e. without any reference to other frames. Moderate compression is achieved by reducing spatial redundancy, but temporal redundancy is not considered. I-frames are typically used periodically to provide access points in a frame stream where decoding can begin.

"Predictive" frames (P-frames) are dependent frames that can use a previous I- or P-frame for motion compensation, and that can be used themselves as a reference for further prediction. By reducing both spatial and temporal redundancy, P-frames offer increased compression compared to I-frames.

Finally, the MPEG standards define "bidirectionally-predictive" frames (B-frames) that can use the previous and next I- or P-frames for motion compensation.

Compression is highest for B-frames, and least for I-frames. However, in contrast to I-frames, P-frames and B-frames can not be decoded independently. That is, for decoding P-frames and B-frames supplemental information with regard to temporal redundancy is required. This supplemental information is typically included in a neighbouring frame, and eventually an I-frame is required as a starting point the decoding operation.

Once coded, the individual frames constituting a media stream can be delivered either via a point-to-point (PTP) transmission or via a point-to-multipoint (PTM) transmission. Existing mobile TV solutions deliver video streams over PTP unicast bearers. With the Multimedia Broadcast Multicast Service (MBMS), Digital Video Broadcast-Handheld (DVB-H) and similar technologies, it will soon become possible to also deliver media streams over PTM bearers (i.e., multicast or broadcast bearers).

The advantage of unicast delivery is the fact that network resources are only allocated as long as there are users requesting a particular media stream. The amount of consumed network resources is determined by the number of concurrent users, but not by the number of different media streams (also called media channels). In the broadcast case, on the other hand, the amount of consumed resources depends on the number of media channels, but is independent from the number of users listening to the media channels. Accordingly, a broadcast service can only deliver a limited number of media channels. Multicast transmission in many aspects behaves similar to broadcast transmission.

There is typically a certain latency when switching to an active channel (i.e. to an on-going stream of media frames) that is delivered by a server device over a multicast or broadcast bearer. The latency exists between the point in time when channel switching is requested by a user and the point in time when the new channel is played out by a client device operated by the user. Specifically, it takes approximately one second for the client device to tune into the new channel. The client device will then have to wait for a reference frame that can be decoded independently (e.g. an I-frame). The average time until an independent frame is received depends on the average interval between two independent frames. Conventional techniques use intervals of about 2 to 3 seconds (although longer intervals would be preferred since longer intervals improve coding efficiency). Once an independent frame has been received, the client device buffers the independent frame and all subsequent frames for about two seconds before decoding and play out can start. The total latency in this example amounts to approximately 3 to 6 seconds and varies depending on the time the client device has to wait for an independent frame. As this latency is undesirable, attempts have been made to reduce the waiting time between tuning into a new channel and channel play out.

US 2005/0081244 A1 describes a PTM scenario in which multiple client devices can tune into various media channels provided over a multicast transmission by a server device. In response to a channel change request received from an individual client device, the server device automatically sends a previous independent frame for the requested channel to the client device in a unicast message. Once the independent frame is received, it is immediately decoded and displayed by the client device. The display is initially static (for up to 2 seconds) until the client device has received the first "regular" independent frame, and the following dependent frames, via the regular multicast transmission. Apparently, the static display, as short as it may be, is undesirable.

Accordingly, there is a need for a technique that permits an improved play out of media frames that are received via a PTM transmission.

SUMMARY OF THE INVENTION

According to a first aspect of the invention, this need is satisfied by a method of controlling a client device for decoding media frames received via a point-to-multipoint transmission, wherein the media frames comprise at least frames of a first type that cannot be decoded without knowledge of supplemental information, and frames of a second type that include the supplemental information. The method comprises the steps of receiving frames at least of the first type; starting buffering the frames without waiting for reception of a frame of the second type; sending a request message to request supplemental information required for decoding of the frames of the first type; receiving the requested supplemental information; and decoding the buffered frames based on the received supplemental information.

Frame buffering may start immediately after an initial frame is received (i.e., already the first frame that is received may be buffered) without waiting for reception of a frame of the second type. In the case decoding can not yet start (e.g., because no frame of the second type has yet been received), information required for starting a decoding of one or more of the frames received thus far may separately be requested, so that there is no need to wait until the required information is received in a regular way. This regular way may be the on-going point-to-multipoint transmission, such as a multicast or broadcast transmission.

The media frames received via the point-to-multipoint transmission comprise at least frames of the first type and frames of the second type. Further frames types (e.g., third or higher frame types) may be used also. The frames of the first type are frames that cannot be decoded independently. Accordingly, the frames of the first type may be constituted by at least one of P-frames and B-frames. The frames of the second type are preferably frames such as I-frames that can be decoded independently.

Frame reception may be initiated in various ways, such as by tuning into a stream of media frames. In such a case initiating frame reception may comprise sending a channel change request (i.e., a request for switching from a first channel to a second channel). Initiating frame reception may also comprise sending a request for tuning into a channel without currently listening to another channel.

The request message sent by the client device to obtain the supplemental information required for decoding may comprise a reference to one or more of the frames of the first types received thus far. The reference may, for example, relate to the frame of the first type that was received and/or buffered first. Signalling of the first frame permits, upon receipt of the corresponding supplemental information, decoding and play out from the first frame onwards.

The frame reference included in the request message may also include an identifier of the particular stream of media frames that comprises the received frames. The stream identifier in combination with, for example, a frame time stamp or a frame sequence number uniquely identifies a particular picture, and, therefore, the corresponding supplemental information required for a decoding of the corresponding frame.

The request message and the supplemental information that is received in response to the request message may be transferred in various ways. Preferably, both the request message and the supplemental information are transferred via unicast transmissions. To this end, a bidirectional unicast connection may be established between the client device and the server device. The unicast connection may be established only temporarily (e.g., until the supplemental information has been received) or remain established for a longer period of time (e.g., while the client device is receiving media frames).

The supplemental information may be received in various different forms. In one scenario, the supplemental information is received in the form of at least one frame of the second type that is associated with one or more of the previously received frames of the first type. If, for example, the received frames of the first type include P-frames and/or B-frames, the supplemental information may be constituted by an I-frame associated with a particular one of the received P-frames and B-frames.

While in most cases the supplemental information will basically relate to temporal redundancy information, additional or alternative information may be received in response to the request message. In this regard, the supplemental information may for example include a decryption key required to encode the received frames.

According to a further aspect of the invention, a method of distributing media frames is provided. The method comprises the steps of transmitting media frames via a point-to-multipoint transmission, wherein the media frames comprise at least frames of a first type that cannot be decoded without knowledge of supplemental information, and frames of a second type that include the supplemental information; receiving a request message that requests supplemental information required for decoding one or more previously transmitted frames of the first type; determining the requested supplemental information; and sending the requested supplemental information.

Determining the requested supplemental information may, for example, comprise determining a frame of the second (or any other) type that includes the requested supplemental information. The frame of the second type that includes the requested supplemental information may be determined based on a reference in the request message to a particular one of the previously transmitted frames.

According to one variant, the step of determining the frame of the second type includes reading the frame of the second type out of a storage (e.g. a buffer). According to another variant, determining the frame of the second type includes specifically generating the frame of the second type for a particular frame of the first time referenced in the request message. This generation can be performed in real-time if required. Generating the frame of the second type in response to the request message takes into consideration that the original stream of media frames will typically include only a few frames of the second type (compared to the amount of frames of the first type), so that for a particular frame of the first type referenced in the request message no "regular" frame of the second type might be readily available (e.g. buffered by the server device).

According to a further aspect of the invention, a computer program product is proposed, the computer program product comprising program code portions for performing the methods disclosed herein when the computer program product is run on one or more computing devices. The computer program product may be stored on a computer-readable recording medium.

According to a still further aspect of the invention, a client device for playing out media frames via a point-to-multipoint transmission is proposed, wherein the media frames comprise at least frames of a first type that cannot be decoded without knowledge of supplemental information, and frames of a second type that include the supplemental information. The client device comprises a first interface for receiving frames at least of the first type; a buffer for buffering the frames received via the first interface without waiting for reception of a frame of the second type; a second interface for sending a request message to request supplemental information required for a decoding of the buffered frames of the first type; a third interface for receiving the requested supplemental information; and a decoder for decoding the buffered frames based on the received supplemental information.

According to another aspect of the invention, a server device for distributing media frames is proposed. The server device comprises a first interface for transmitting media frames via a point-to-multipoint transmission, wherein the media frames comprise at least frames of a first type that cannot be decoded without knowledge of supplemental information, and frames of a second type that include the supplemental information; a second interface for receiving a request message that requests supplemental information required for decoding one or more previously transmitted frames of the first type; a unit for determining the requested supplemental information; and a third interface for sending the requested supplemental information. The server device may further comprise a generator for generating a frame of the second type comprising the supplemental information for a particular frame of the first type as referenced in the requested message.

It should be noted that two or more of the individual interfaces of each of the client device and the server device could be combined into a single interface.

BRIEF DESCRIPTION OF THE DRAWINGS

In the following, the invention will be described in more detail with reference to exemplary embodiments illustrated in the Figures, in which.

DETAILED DESCRIPTION OF PREFERRED EMBODIMENTS

In the following description, for purposes of explanation and not limitation, specific details are set forth, such as specific network topologies including particular network nodes, transmission modes, etc., in order to provide a thorough understanding of the present invention. It will be apparent to one skilled in the art that the present invention may be practised in other embodiments that depart from these specific details. For example, the skilled artisan will appreciate that the invention may be practised in combination with point-to-multipoint services and frame types different from the services and frame types discussed below to illustrate the present invention.

Those skilled in the art will further appreciate that the functions explained herein below may be implemented using individual hardware circuitry, using software or firmware functioning in conjunction with a programmed micro processor or general purpose computer, using an Application Specific Integrated Circuit (ASIC) and/or using one or more Digital Signal Processors (DSPs). It will also be appreciated that while the current invention is primarily described in context with various device and method embodiments, it may also be embodied in a computer processor and a memory coupled to the processor, wherein the memory is encoded with one or more programs that perform the methods disclosed herein when executed by the processor.

The term "interface" as used herein comprises functional interfaces. A functional interface designates a sub-structure contained within a functional component or structure (e.g. a hardware, firmware and/or software component of a functional entity) intended for communication with other external components or structures. A functional interface may be software-implemented if the structure, for which the functional interface provides the interfacing functionality, is a software component.

Figure 1:
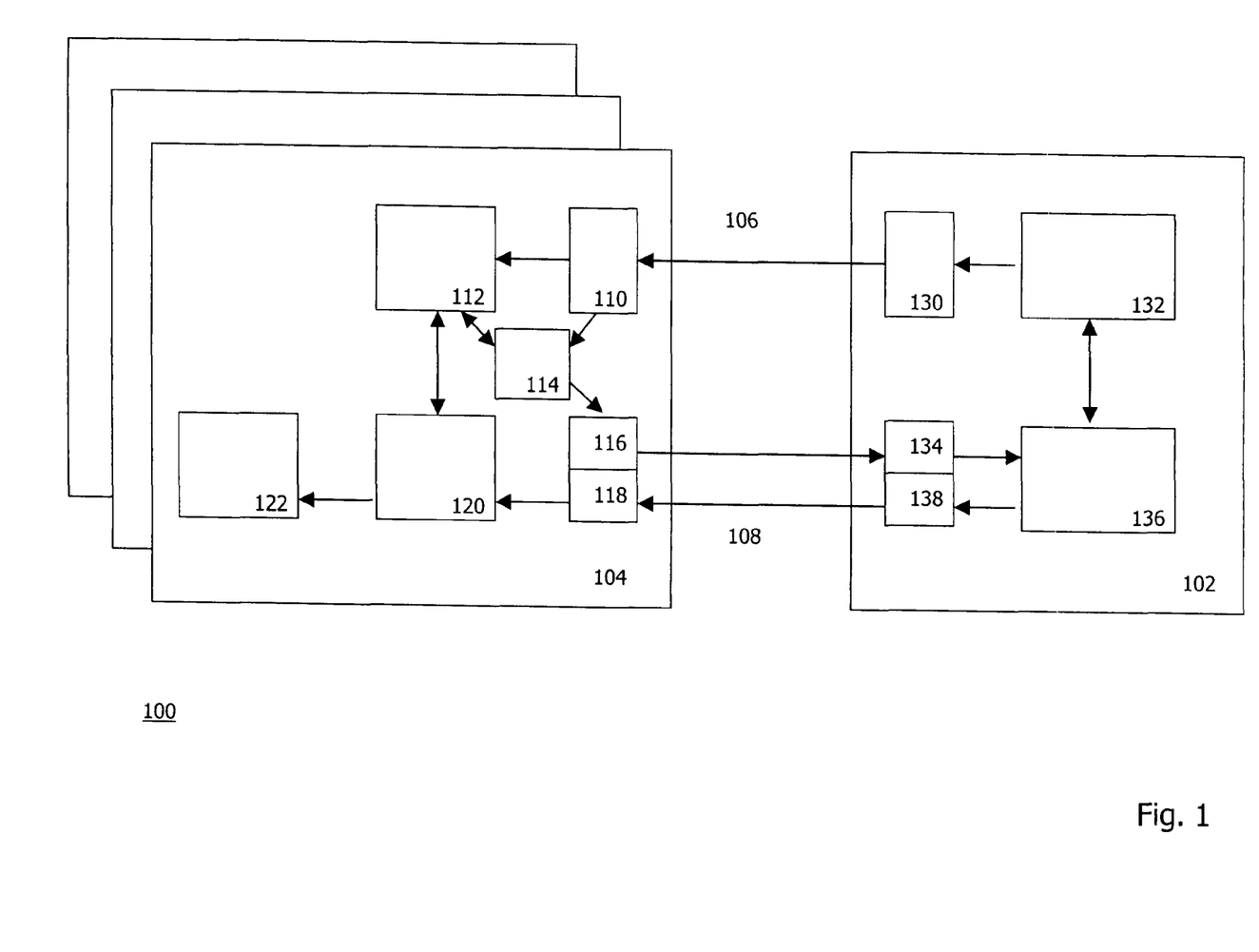
FIG. 1 is a schematic illustration of a system embodiment including a client device and a server device communicating with each other.

FIG. 1 schematically illustrates an embodiment of a system 100 including a server device 102 and a plurality of client devices. For the sake of simplicity, only a single client device 104 is illustrated in FIG. 1 in more detail.

The server device 102 simultaneously communicates with the plurality of client devices 104 via a point-to-multipoint (PTM) connection 106. The connection 106 is uni-directional and originates from the server device 102. The server device 102 can further selectively communicate with each of the client devices 104 over an individual unicast or point-to-point (PTP) connection 108. The unicast connection 108 allows for a bidirectional communication.

The client device 104 is a multimedia-enabled device capable of playing out media frames received via the PTM connection 106 from the server device 102. To this end, the client device 104 comprises a first interface 110 for receiving the media frames from the server device 102. The media frames received by the client device 104 include frames of a first type that cannot be decoded without knowledge of supplemental information and frames of a second type that include the supplemental information.

The client device 104 further comprises a buffer 112 for buffering the frames received via the first interface 110. A controller 114 controls the frame buffering in such a manner that buffering immediately starts upon receipt of frames for a new media stream without waiting for reception of a frame of the second type. Simultaneously with initiating the buffering operation, the controller 114 generates a request message to request supplemental information required for a decoding of buffered frames of the first type. This request message is sent via a second interface 116 and over the unicast connection 108 to the server device 102 (or, in an alternative embodiment, to a component different from the server device 102). The requested supplemental information is received over the same unicast connection 108 and via a third interface 118 of the client device 104. It should be noted that the second interface 116 and the third interface 118 are integrated into a single interface component.

As becomes apparent from FIG. 1, the client device 104 further comprises a decoder 120. The decoder 120 is coupled to the third interface 118 and to the buffer 112. Based on the received supplemental information, the decoder decodes the buffered frames. The decoded frames are then forwarded by the decoder 120 to a video display 122 for play out.

During play out the client device 104 continuously receives further frames from the server device 102. As these further frames typically also include a certain percentage of frames of the second type with specific supplemental information, it is generally sufficient to sent the request message only once and in context with initiating the decoding operation.

Turning now to the server device 102, it becomes apparent from FIG. 1 that the server device 102 comprises a first interface 130 for transmitting media frames via the PTM connection 106 to the various client devices 104. Typically, the server component 102 transmits different media channels, each media channel corresponding to a particular stream of media frames. The individual media frames transmitted via the first interface 130 are obtained from a media source 132, which could be a buffer or an interface to another device (not shown).

The server device 102 further comprises a second interface 134 for receiving over a particular unicast connection 108 a request message from one of the client devices 104. The request message requests supplemental information required for decoding one or more previously transmitted frames of the first type. A processing unit 136 processes the request message received via the second interface 134 to determine the requested supplemental information. Once determined, the supplemental information is obtained (e.g. retrieved from the media source 132 or specifically generated by the processing unit 136) and sent via a third interface 138 over the unicast connection 108 to the requesting client device 104.

Figure 2:
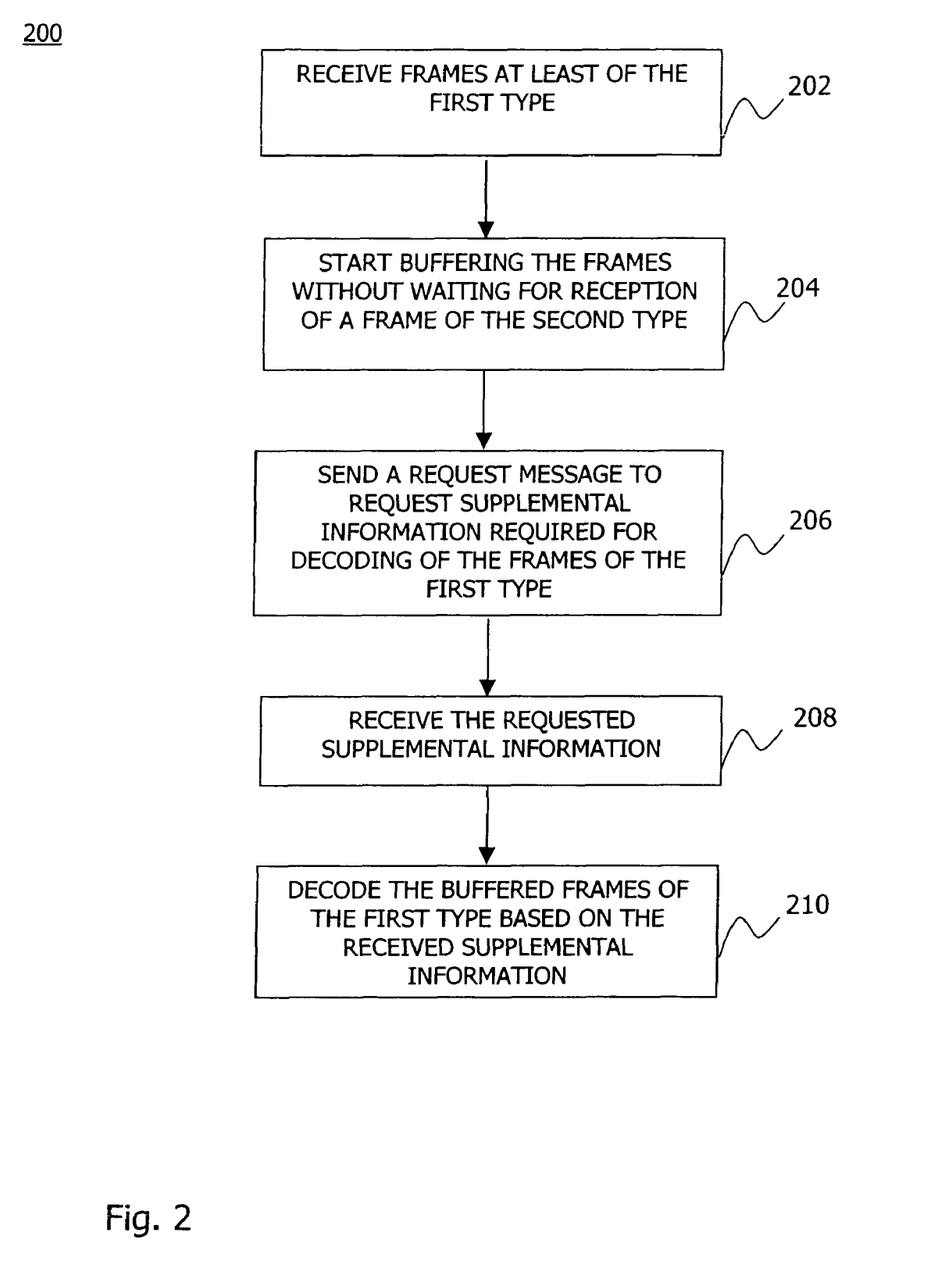
FIG. 2 is a schematic flowchart illustrating a method embodiment for playing out media frames.

FIG. 2 shows a flowchart 200 of a first method embodiment for controlling a client device (such as the client device 104) in context with the decoding and play out of media frames.

In a first step 202 media frames are received over a PTM connection. The received media frames comprise at least frames of a first type that cannot be decoded without knowledge of supplemental information that is typically included in frames of a second type. In a next step 204, the received frames (including the frames of the first type) are immediately buffered from the first received frame onwards without waiting for reception of a frame of the second type.

Concurrently with buffering the received frames, a request message is generated. With the request message, supplemental information required for a decoding of the buffered frames of the first type is requested. The request message is sent in a next step 206 either to the device from which the frames have been received (e.g. the server device 102 of FIG. 1), or to another device. Then, in step 208, the requested supplemental information is received. Based on the received supplemental information, decoding of the buffered frames of the first type can start immediately (step 210), and play out can begin.

Figure 3:
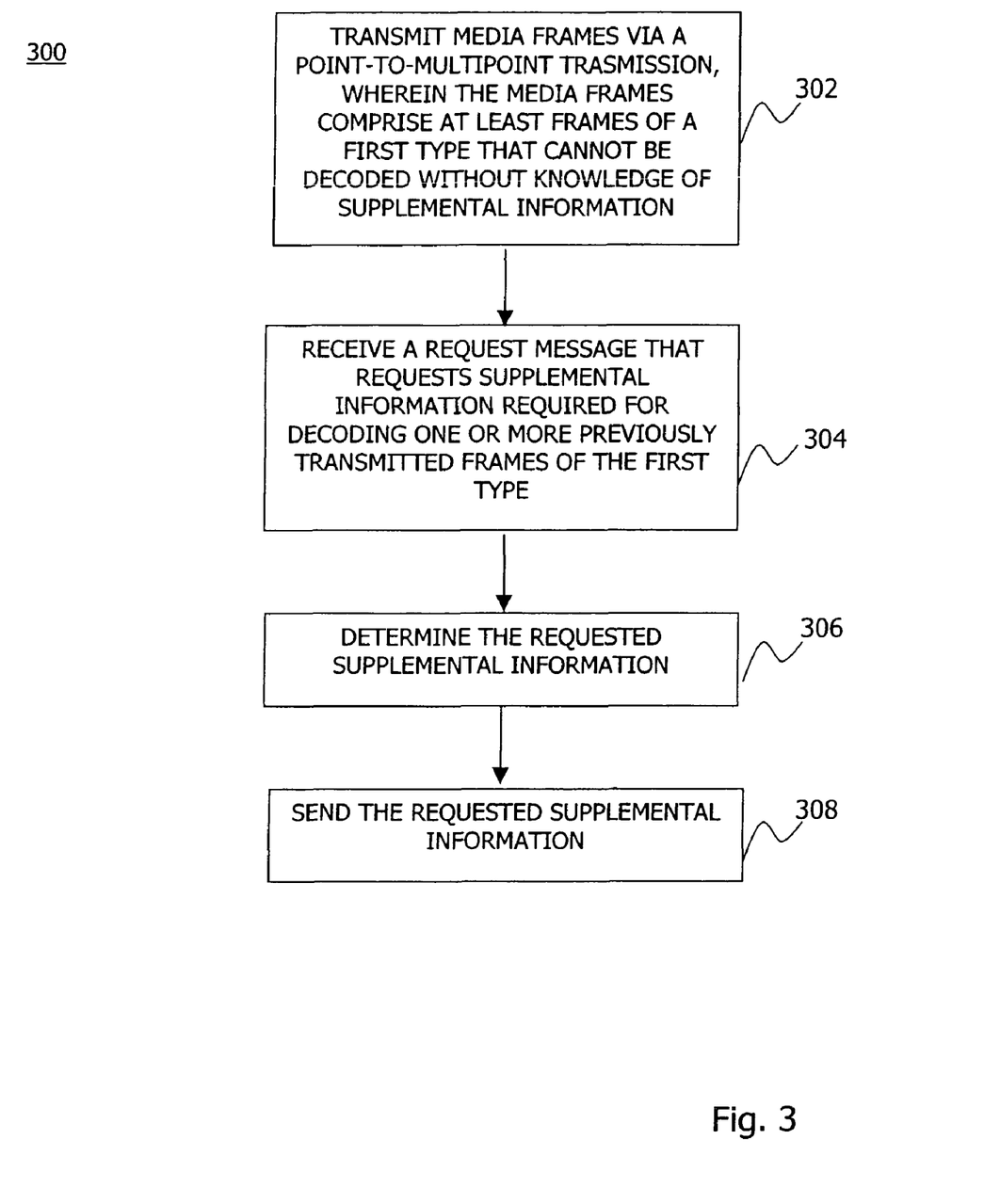
FIG. 3 is a schematic flowchart of a method embodiment for distributing media frames.

FIG. 3 shows a flowchart 300 of a method embodiment for distributing media frames. The method embodiment may be performed by the server device 102 of FIG. 1 or one or more devices having a different configuration.

In a first step 302, media frames are transmitted via a PTM transmission to a plurality of client devices (having, e.g., a configuration as shown for the client device 104 in FIG. 1). The media frames comprise at least frames of a first type that cannot be decoded without knowledge of supplemental information that is typically included in frames of a second type.

In a next step 304, a request message is received that requests supplemental information required for decoding one or more previously transmitted frames of the first type. Then, in step 306, the requested supplemental information is determined and obtained. In a final step 308, the supplemental information is sent to the requesting device.

Figure 4:
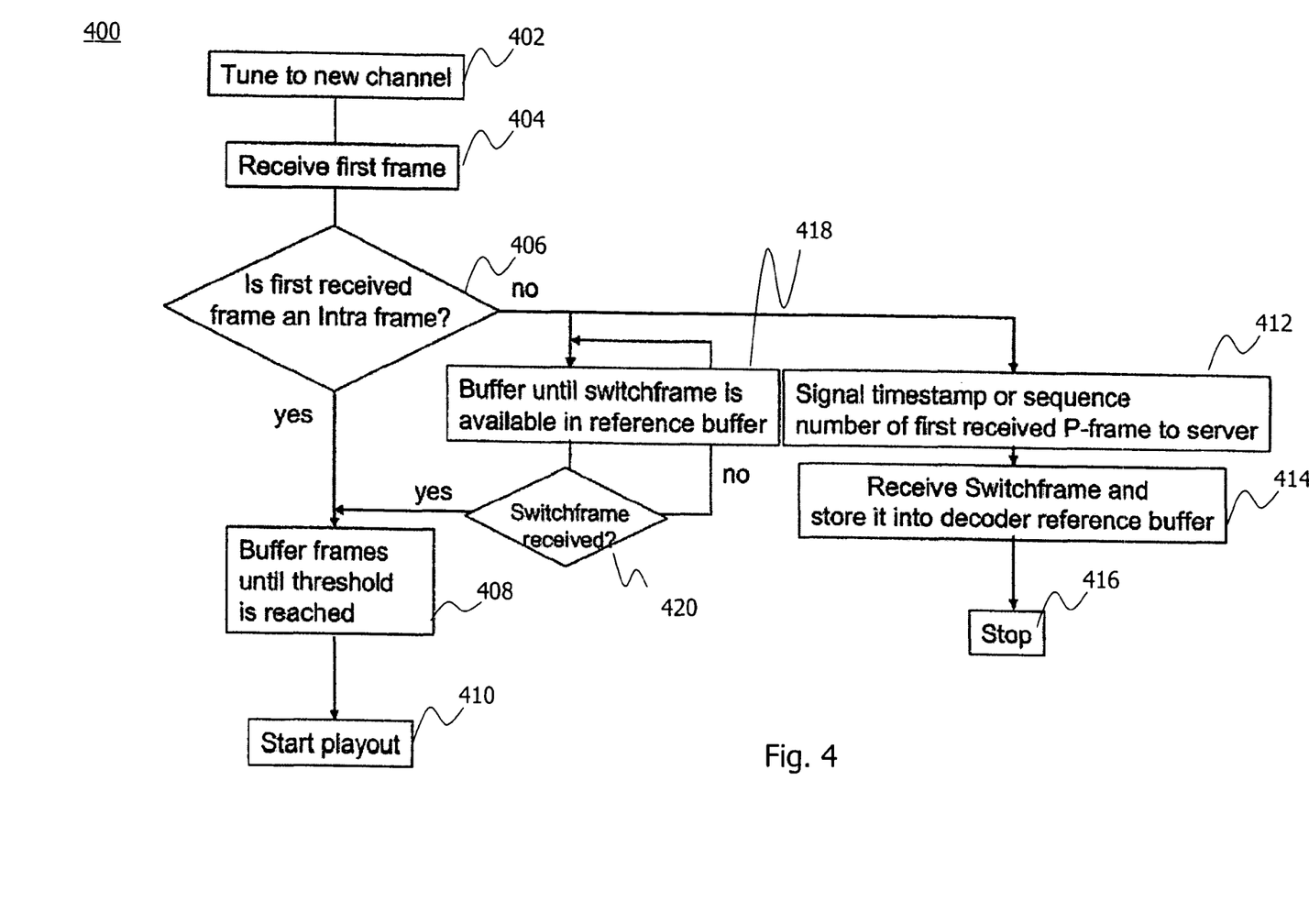
FIG. 4 is a schematic flowchart of a more detailed method embodiment for playing out media frame.

FIG. 4 shows a flowchart 400 of another method embodiment for a seamless channel switch. The method embodiment may be performed by the client device 104 shown in FIG. 1, or by a client device having a different configuration.

The method starts in step 402 with a user controlling the client device to tune into a new channel. Tuning into a new channel is typically accompanied by a channel change request message that is sent by the client device to a server device. The channel change request message may for example aim at switching from a PTP channel to a PTM channel, or from a first PTM channel to a second PTM channel. Alternatively, step 402 may be performed in context with switching from an idle mode to a new PTM channel. In either case, the new PTM channel will typically be sent over a multicast or broadcast bearer.

In the present embodiment, it will be assumed that the individual frames transmitted via the new channel have been encoded according to one of the MPEG standards and include both independent frames (I-frames) as well as dependent frames (P- or B-frames).

The method starts with tuning to a new channel in step 402. Shortly after the client device has tuned to the new channel, a first frame is received in step 404.

In step 406 is determined whether the first frame received in step 404 is already an I-frame. If it turns out in step 406 that the first frame actually is an I-frame, conventional frame buffering takes place in step 408 until a predefined buffer filling level or threshold is reached. Once it is determined that enough frames have been buffered for a continuous play out, frame decoding and play out takes place in step 410.

If, on the other hand, it is determined in step 406 that the first received frame is not an I-frame, but, for example, a P-frame, the method proceeds with two parallel processing branches.

In a first processing branch, supplemental information required for decoding the received first frame (P-frame) is requested by means of a corresponding request message that sent in step 412. The request message uniquely identifies the first received frame. To this end, the request message references both the new media stream (e.g., via a media stream identifier) and the position of the first received frame in this media stream. The position of the frame within the media stream can for example be specified by a time stamp or sequence number signalled in a header of a data packet which contains the particular frame. The packet may have been generated in accordance with the Real-time Transport Protocol (RTP). The media stream identifier, on the other hand, can be uniquely identified via a Synchronization Source (SSRC) identifier used in the corresponding RTP packet. Both SSRC identifier and time stamp/sequence number information are then incorporated in the request message (e.g. an HTTP Get request) that is sent to the server device in step 412.

In response to receipt of the HTTP Get request, the server device identifies frame (and stream) referenced therein and determines the supplemental information required by the client device for decoding the particular frame. This supplemental information is called "switch frame" in the present embodiment and corresponds to an I-frame specifically generated by the server device for the particular frame identified in the request message. In context with generating the switch frame, a picture having the full informational content required for the decoding process is encoded by any conventional video or still image compression technique (such as MPEG and JPEG) and sent to the requesting client device.

The client device receives the switch frame including the supplemental information required for decoding the first received P-frame in step 414. The received switch frame is stored in a decoder reference buffer (that may be the same as or different from the buffer described above with reference to step 408 and below with reference to step 418), and the first processing branch stops in step 416.

In parallel to the operations performed in the first processing branch, in a second processing branch all frames starting with the first frame received in step 404 are buffered in step 418 until a switch frame becomes available (step 414). In step 420 it is then determined whether or not a switch frame has already been received. If no switch frame has yet been received, the method loops back to step 418. Otherwise the method continues with step 408. Based on the received switch frame, the frame that has been received first (P-frame) can be decoded and from the decoded frame onwards, decoding of all other frames that have meanwhile been buffered becomes possible. Once decoded, the resulting pictures can be played out, for example in the form of TV-program in step 410.

In the embodiment shown in FIG. 4, the total latency between steps 402 and 410 can be reduced to three seconds and less. This short latency is a result of the immediate buffering starting with the first frame received. Specifically, there is no need to wait for an I-frame before buffering can start. Another advantage of this approach is the fact that the latency is more or less fixed and does not depend on the point in time a user requests a channel switch. Furthermore, additional information can be sent by the server device together with the switch frame (typically over a unicast connection). This additional information may, for example, include one or more decryption keys that might be required for a decoding of the new channel (e.g., if content decryption techniques are used).

The technique proposed herein is generally applicable to all scenarios in which a client device such as a mobile telephone or any other user terminal can simultaneously receive data over PTP and PTM connections. This includes, for example, all combinations between the General Packet Radio Service (GPRS), the Universal Mobile Telecommunication Systems (UMTS), a Wireless Local Area Network (WLAN), Digital Multimedia Broadcasting (DMB), DVB-H, MBMS, and so on.

The provision of a bi-directional PTP connection reduces switching delays when switching to PTM channels. Via the PTP connection, the position of the first or one of the first received frames of the new channel can be signalled and a complete picture (e.g., in the form of a specifically generated and independently decidable frame) plus additional information (such as decryption keys) can be transferred, thus permitting a decoding from the first received frame onwards. Moreover, the technique allows for longer I-frame intervals in PTM channels, which improves the coding efficiency.

While the current invention has been described in relation to its preferred embodiments, it to be understood that this description is intended for illustrative, non-limiting purposes only. The invention shall be limited only by the scope of the claims appended hereto.

The invention claimed is:

1. A method of controlling a client device for decoding media frames received via a point-to-multipoint transmission, wherein the media frames comprise frames of a first type comprising a Predictive frame and Bidirectionally-predictive frames that cannot be decoded without knowledge of supplemental information and frames of a second type that include the supplemental Information, the method comprising the steps of:
   initiating frame reception by tuning into a new media stream;
   receiving media frames of the first type comprised in the media stream;
   starting buffering of the media frames of the first type comprised in the media stream without waiting for reception of a frame of the second type;
   sending a request message to request supplemental information required for a decoding of one or more of the received frames of the first type comprised in the media stream;
   receiving the requested supplemental information; and
   decoding the buffered frames based on the received supplemental information.

2. The method of claim 1, wherein the frames of the second type are constituted by Infra frames (I-frames).

3. The method of claim 1, wherein initiating frame reception comprises sending a channel change request.

4. The method of claim 1, wherein the request message comprises a reference to one or more of the frames of the first type.

5. The method of claim 4, wherein the reference relates to the frame of the first type that was received or buffered first.

6. The method of claim 4, wherein the reference includes at least one of a time stamp and a sequence number of one or more of the frames of the first type.

7. The method of claim 4, wherein the reference includes an identifier of a stream of media frames comprising the received frames.

8. The method of claim 1, wherein the requested supplemental information is received in the form of at least one frame of the second type associated with one or more of the received frames of the first type.

9. The method of claim 1, further comprising receiving a decryption key required to decode the received frames.

10. A method of distributing media frames, the method comprising the steps of:
    transmitting a media stream comprising media frames via a point-to-multipoint transmission, wherein the media frames comprise frames of a first type comprising at least one of Predictive frames and Bidirectionally-predictive frames that cannot be decoded without knowledge of supplemental information and frames of a second type comprising Intra frames that include the supplemental information;
    enabling a recipient to tune into the media stream;
    receiving from the recipient a request message that requests supplemental information required for a decoding of one or more previously transmitted frames of the first type comprised in the media stream;
    determining the requested supplemental information; and
    sending the requested supplemental.

11. The method of claim 10, wherein determining the requested supplemental Information comprises determining a frame of the second type that includes the requested supplemental information.

12. The method of claim 11, wherein the request message Includes a reference to a particular one of the previously transmitted frames of the first type, wherein the frame of the second type is specifically generated for the referenced frame of the first type.

13. A client device for playing out media frames received via a point-to-multipoint transmission, wherein the media frames comprise frames of a first type comprising one of Predictive frames and Bidirectionally-predictive frames that cannot be decoded without knowledge of supplemental information and frames of a second type comprising Intra frames that include the supplemental information, the client device comprising:
    a first Interface for initiating frame reception by tuning into a new media stream and for receiving media frames of the first type comprised in the media stream;
    a buffer for buffering the frames comprised in the media stream and received via the first interface without waiting for reception of a frame of the second type;
    a second interface for sending a request message to request supplemental information required for a decoding of one or more of the received frames of the first type comprised in the media stream;
    a third interface for receiving the requested supplemental information; and
    a decoder for decoding the buffered frames based on the received supplemental information.

14. A server device for distributing media frames, the server device comprising:
    a first interface for transmitting a media stream comprising media frames via a point-to-multipoint transmission, wherein the media frames comprise frames of a first type comprising at least one of Predictive frames and Bidirectionally-predictive frames that cannot be decoded without knowledge of supplemental information and frames of a second type comprising Intra frames that include the supplemental information;

a functionality for enabling a recipient to tune into the media stream;

a second interface for receiving from the recipient a request message that requests supplemental information required for a decoding of one or more previously transmitted frames of the first type comprised in the media stream;

a unit for determining the requested supplemental Information; and a third interface for sending the requested supplemental information.

* * * * *

UNITED STATES PATENT AND TRADEMARK OFFICE
CERTIFICATE OF CORRECTION

PATENT NO.         : 8,208,561 B2                                              Page 1 of 1
APPLICATION NO.    : 12/375300
DATED              : June 26, 2012
INVENTOR(S)        : Horn et al.

It is certified that error appears in the above-identified patent and that said Letters Patent is hereby corrected as shown below:

In the Claims

In Column 9, Line 39, in Claim 1, delete "Information," and insert -- information, --, therefor.

In Column 9, Line 56, in Claim 2, delete "Infra frames" and insert -- Intra frames --, therefor.

In Column 10, Line 30, in Claim 11, delete "Information" and insert -- information --, therefor.

In Column 10, Line 47, in Claim 13, delete "Interface" and insert -- interface --, therefor.

In Column 12, Lines 4-5, in Claim 14, delete "Information;" and insert -- information; --, therefor.

Signed and Sealed this
Fifteenth Day of April, 2014

Michelle K. Lee
*Deputy Director of the United States Patent and Trademark Office*